Figure 1:
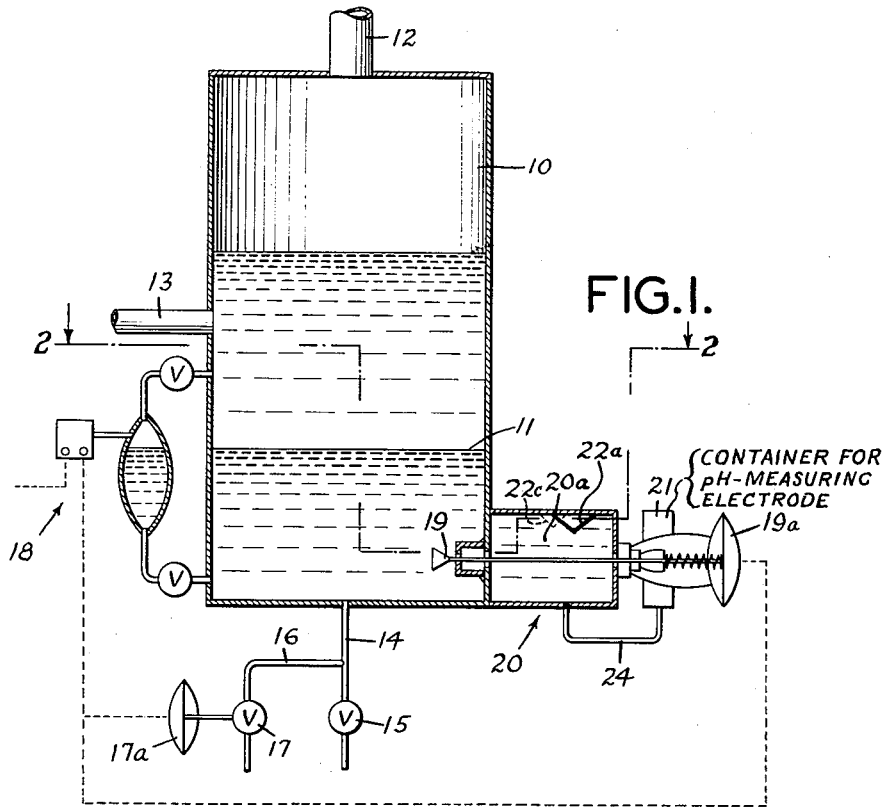

June 26, 1956     E. C. BARAN ET AL     2,752,307

PH SAMPLING APPARATUS

Filed Oct. 10, 1950

INVENTORS.
EDWARD C. BARAN
WILLIAM H. FLETCHER
HENRY A. JATZEK
MICHAEL A. PAPPAS

BY Campbell, Brumbaugh
Free & Graves
THEIR ATTORNEYS.

United States Patent Office 2,752,307
Patented June 26, 1956

2,752,307 pH SAMPLING APPARATUS

Edward C. Baran, Euclid, William H. Fletcher, Hudson, Henry A. Jatzek, Parma Heights, and Michael A. Pappas, Lima, Ohio, assignors to The Standard Oil Company, Cleveland, Ohio, a corporation of Ohio Application October 10, 1950, Serial No. 189,414

1 Claim. (Cl. 204—195)

The present invention relates to apparatus for sampling liquid from a continuous flow of liquid for passage to the electrode housing of a pH measuring device.

Although the scope of the present invention is not to be limited thereto, the apparatus is useful particularly for recording the pH of the water in a vessel such as the reflux drum of a fractionating tower. This drum is usually located near the top of a distillation or fractionation column in which hydrocarbons are being distilled. The gaseous hydrocarbons from the top of the column pass through a condenser in which the lower boiling hydrocarbons and water are continuously condensed. All or part of the condensate is then passed to a reflux drum wherein the condensate separates into an upper layer of hydrocarbon and a lower layer of water. Hydrocarbons are continuously withdrawn from the upper layer to be introduced in the fractionating column as a reflux and water is normally withdrawn continuously from the bottom of the reflux drum.

In the operation of a petroleum refinery, it is important to ascertain and usually to record the pH of the water in the reflux drum so that the formation of certain acid products formed during the hydrocarbon treatment can be controlled and the corrosion of condensing and other equipment can be minimized or avoided. This is generally done by a recording pH measuring instrument having a glass electrode which is immersed in the water, as is well known in the art.

It is known that the contact of any oil with pH measuring electrodes will destroy the accuracy of any pH determinations made thereby. It has, therefore, been a problem in the industry to design apparatus which will continuously measure the pH of the condensate water without being subject to inaccuracies due to the contacting of oil with the pH measuring electrodes. It is to the solution of this problem that this invention is particularly addressed.

The apparatus of the present invention includes a control mechanism for automatically maintaining above a predetermined minimum the height of the water level in a drum through which the sampled water passes. The mechanism operates in synchronism two valves that are normally open during operation, one valve to drain the water from the drum at substantially the same rate it is introduced from the condenser, and a sampling valve for feeding a portion of the water to the pH measuring electrode. In addition, there is preferably provided, between the sampling valve and the electrode unit, a mechanism designed to separate any oil that might otherwise enter the electrode unit, as well as means for permitting a blow down of the reflux drum.

Figure 2:
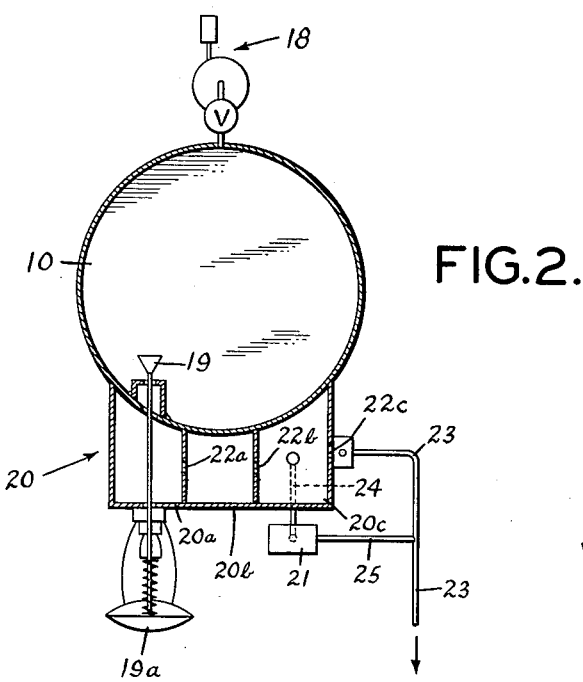

A more complete understanding of the invention will be obtained from the following detailed description made with reference to the accompanying drawing, which illustrates the best mode contemplated for carrying out the invention. In the drawing:

Figure 1 is a sectional view in elevation of a preferred embodiment of the device; and Figure 2 is a section taken on section line 2—2 of Figure 1.

Referring now to the drawing, a reflux drum 10 is shown containing water and hydrocarbon, the level of the interface between the hydrocarbon and the water being indicated at 11. Condensed hydrocarbons and water enter from the condenser through the pipe 12, and hydrocarbons are fed as reflux to the fractionating tower through the pipe 13. A drain line 14 provided with a blow down valve 15, a by-pass 16 and a level control valve 17, extends from the bottom of the drum. The drum 10 is further provided with a device 18 for sensing the level of the water in the drum and a sampling and pH measuring device including a sampling valve 19, a skimming trough shown generally at 20 and an electrode housing 21.

The skimming trough 20 is divided, in the embodiment illustrated, into trough sections 20a, 20b and 20c connected as shown by weirs 22a and 22b. A final weir 22c connects with a waste line 23. The trough section 20c is connected to the electrode housing 21 by way of a line 24 and the electrode housing is in turn connected to the waste line 23 by a pipe 25, both lines 24 and 25 being below the level of the weir 22c.

In operation the blow down valve 15 is normally closed and the reflux drum 10 contains water and hydrocarbon as described above. Whenever the level 11 of the water goes below a predetermined minimum above the sampling valve 19, the level sensing device 18 operates, through controlling mechanism 17a and 19a which are in parallel, to close both valves 17 and 19, thus avoiding the entry into trough 20 of any hydrocarbon above the water level 11 from the drum 10 and through the valve 19. When further additions of condensate to the reflux drum raise the water level again, device 18 will reopen valves 17 and 19 so that the sampling and pH measurements can automatically be resumed. The water entering trough 20 by way of valve 19 flows successively through trough section 20a, weir 22a, trough section 20b and weir 22b into trough section 20c. Any hydrocarbon that may have entered the trough 20, being of lower specific gravity than the water, seeks an upper level and, after flowing over weirs 22a and 22b, flows over weir 22c into waste line 23, whereas, the water after passing through the trough sections 20a and 20b in succession to trough section 20c, enters the electrode housing 21 and leaves by way of pipe 25 to enter the line 23 leading to a sewer or other disposal medium. The function of the weirs 22a and 22b is to reduce the turbulence of the flow of water and hydrocarbon to prevent the hydrocarbon from mixing with the water and to insure that the hydrocarbon is maintained at the upper level during said flow so that it will be discharged through the waste line 23.

The water level sensing means 18 and the valves 17 and 19 may be operated electrically or pneumatically. They are conventional in the art and are described in standard handbooks, e. g., Chemical Engineers' Handbook, Perry, 3rd edition, pages 1326 and 13334. Any such level controlling means and valves may be used.

When it is desired to blow the tank down for any reason, such as to remove the scum of the interface, the blow down valve 15 is opened. The resulting drop in the water level 11 automatically causes the device 18 to close the valves 17 and 19 so that there will be no danger of having hydrocarbon pass into the trough 20 and come into contact with the points of the electrodes in the electrode housing 21.

It is to be understood that many changes and modifications will become apparent to those skilled in the art upon reading the present description. All such changes and

We claim:

Apparatus for sampling and measuring the pH of water in a vessel containing a bottom layer of water and a top layer of hydrocarbon, which comprises a device for sensing the level of the water in the vessel, a pH measuring device including electrodes and a housing therefor outside the vessel, a trough communicating at one end with the lower portion of the vessel, a pipe connecting the bottom of the trough at the other end to the housing, a valve for controlling the flow of water from the vessel through the trough and the pipe to the housing, said valve being actuated by the water level sensing device to open and thereby permit a flow of water from the vessel to the electrode housing when the water level is above a predetermined minimum in the vessel and to close when the water level in the vessel falls below said predetermined minimum, and a weir in the trough for removing any hydrocarbon from the water entering the trough prior to its passage into the housing.

References Cited in the file of this patent

UNITED STATES PATENTS

| Number | Name | Date |
|---|---|---|
| 1,032,458 | White | July 16, 1912 |
| 1,284,343 | Horner | Nov. 12, 1918 |
| 1,530,833 | Keeler | Mar. 24, 1925 |
| 2,072,206 | Hetzer | Mar. 2, 1937 |
| 2,154,529 | Raymond | Apr. 18, 1939 |
| 2,182,145 | Eddy | Dec. 5, 1939 |
| 2,225,798 | Price | Dec. 24, 1940 |
| 2,338,986 | Waterman | Jan. 11, 1944 |
| 2,366,383 | Cameron | Jan. 2, 1945 |
| 2,380,458 | Nees et al. | July 31, 1945 |
| 2,459,404 | Anderson | Jan. 18, 1949 |
| 2,562,653 | Williams | July 31, 1951 |
| 2,568,309 | Werts | Sept. 18, 1951 |